(12) United States Patent
Chiang

(10) Patent No.: US 8,522,161 B2
(45) Date of Patent: Aug. 27, 2013

(54) VISUAL IMAGE SEARCHING METHOD

(76) Inventor: Kuo-Ching Chiang, Taipei County (TW)

( * ) Notice: Subject to any disclaimer, the term of this patent is extended or adjusted under 35 U.S.C. 154(b) by 113 days.

(21) Appl. No.: 13/025,413

(22) Filed: Feb. 11, 2011

(65) Prior Publication Data
US 2011/0199374 A1 Aug. 18, 2011

(30) Foreign Application Priority Data
Feb. 12, 2010 (TW) .............................. 99104766 A

(51) Int. Cl.
*G06F 3/048* (2013.01)
(52) U.S. Cl.
USPC ........... 715/810; 715/758; 715/788; 707/707; 345/6

(58) Field of Classification Search
None
See application file for complete search history.

(56) References Cited

U.S. PATENT DOCUMENTS

| | | | |
|---|---|---|---|
| 7,268,747 B2* | 9/2007 | Taniguchi et al. | 345/6 |
| 7,912,829 B1* | 3/2011 | Mathes et al. | 707/707 |
| 8,006,197 B1* | 8/2011 | Nevill-Manning et al. | 715/788 |
| 8,082,511 B2* | 12/2011 | Sobotka et al. | 715/758 |

* cited by examiner

*Primary Examiner* — Boris Pesin
*Assistant Examiner* — Ayesha Huertas Torres
(74) *Attorney, Agent, or Firm* — Chih Feng Yeh; Huntington IP Consulting Co., Ltd

(57) ABSTRACT

The method discloses a searching method by visual image, the method includes connecting to a searching engine, and then the user terminal transmits a key word to the searching engine. The searching outputs searching results which includes the virtual image and the web linking information to the user terminal. The user may use the cursor or finger to indicate a certain image to show the summary of the web site.

8 Claims, 12 Drawing Sheets

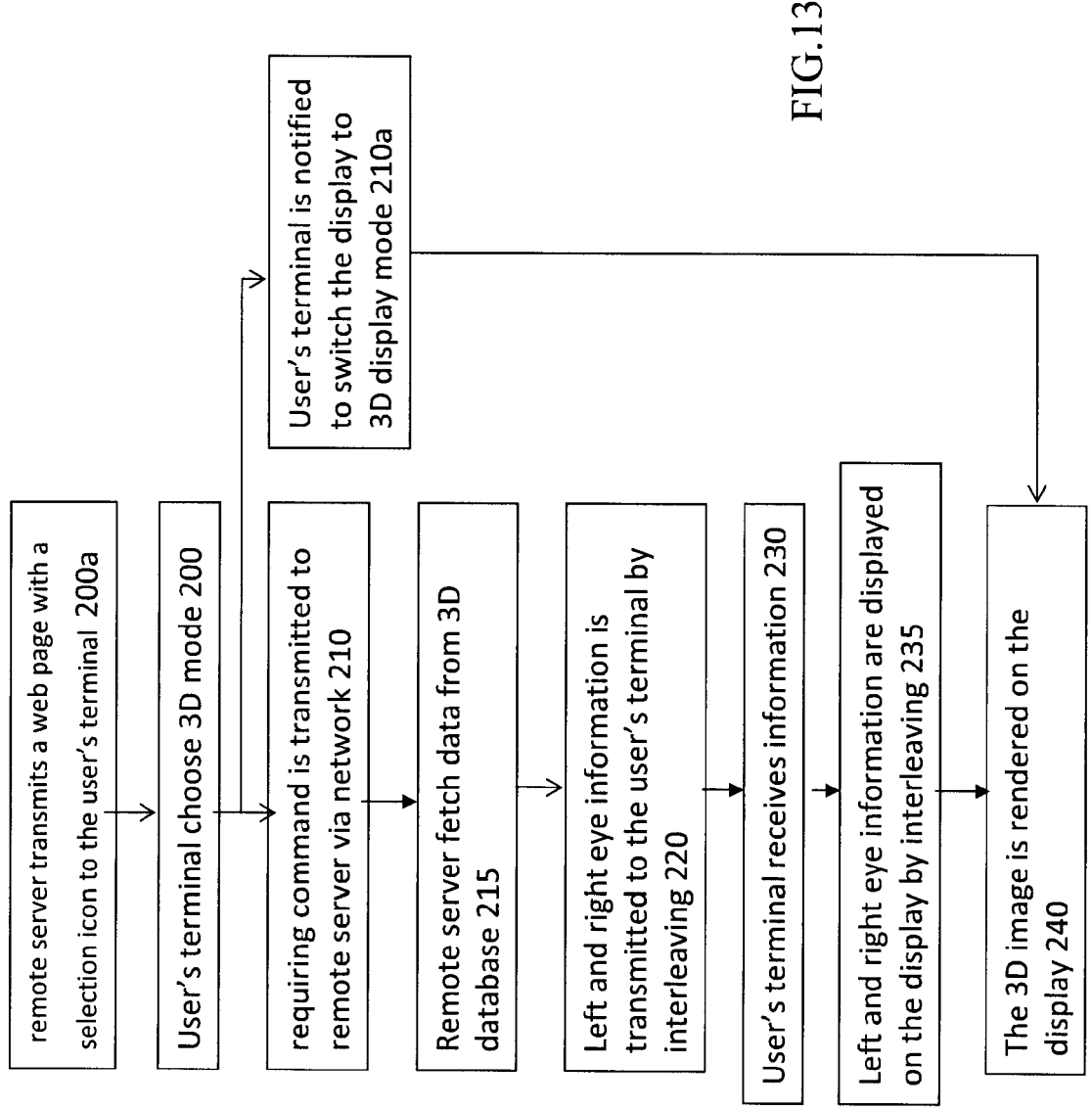

VISUAL IMAGE SEARCHING METHOD

FIELD OF THE INVENTION

The present invention generally relates to network search, in particular, to a visual image searching method of a portal website or a searching engine.

DESCRIPTION OF THE PRIOR ART

In pace with the development of information and computer technology, electronic products grow rapidly in trend of small size, multifunction and high operation rate. Based on the incoming era of high technology, telecommunication network and internet becomes a rising industry currently. Following by progress of mobile phone integration technology, communication systems have also been introduced to provide users to obtain information more conveniently. Thus, the communication technology turns to be a recent favorite in the industry, and the communication device business flourishes rapidly due to the essential requirements of communication and the convenience of fetching information. Therefore, Internet, cellular devices, and PDAs (personal digital assistant) have flooded in the daily life. The internet and communication providers also supply various business services to assist clients to transmit or receive information for extending the market and the coverage of services. And the electronic components tend to become small size, multifunction, and high speed. The communication services providers or the information services providers also have to provide diverse, comprehensive and updated information to the clients. The website providers also have to provide sundry services in addition to the profits from advertisements, so as to increase the amount of users. The search system is a system employing the computer to browse, and it can search desired data in a large-scale digital database. Most traditionally searching method is to introduce some metadata, such as captions, or keywords, so that the search can be accomplished through those words. For instance, referred to FIG. 1 and FIG. 3, the user terminal can link to the portal website or the searching engine via the internet, and the home page information, which can be transferred to the user terminal for showing on the display, is capable of providing various services and links including the search box S. FIG. 1 and FIG. 3 respectively show the page of YAM and GOOGLE at 2010 Feb. 10, and FIG. 5A shows the home page of MSN at 2010 Feb. 12. When entering the keyword or the character string K, such as AVATAR, and clicking the searching icon, the results can be listed out after matching, referred to FIG. 2, FIG. 4 and FIG. 5B. In recent time, all portal websites just show the title and outline or abstract of the results by text, and the user has to click them to view the content one by one, so as to recognize that the result is the official website (FIG. 6), the film reviews (FIG. 7) or the movies website, Because the characteristics of the search results are pretty similar, the abstract or the outline is also very alike, it is hard to recognize for the user, and the user has to spend too much time to get desired information, so it is quite inconvenient for the user.

SUMMARY OF THE INVENTION

Based on aforementioned reasons and people are likely visual animals, the present invention discloses a visual image searching method.

A visual image searching method comprises steps of: providing a server, which includes a visual image searching engine. The server is connected by a user's terminal which is capable of connecting the server, and the user's terminal includes a display. A searching character string is input and transmitted to the server by the user's terminal via a network; followed by transmitting searching results to the user's terminal by the server through the network, and the searching results include website links corresponding to the character string, images corresponding to the website links, and the images corresponding to the website links are shown through the display.

The method further comprises a step of moving a mouse or a finger to one of the image and then showing the outline of the link.

The method further comprises a step of showing the website of the link. If the image is a stereo image, the display is a three-dimension display.

The display may be a touch panel. The user's terminal comprises a computer, a notebook, or a portable communication device. Aforementioned network may be cellular, such as GSM or CDMA, WiMAX, or Internet network.

The method further comprises clicking the icon, and the corresponding website can further be linked after the icon is clicked.

BRIEF DESCRIPTION OF THE DRAWINGS

FIG. 13 shows the flow chart of the present invention.

DESCRIPTION OF THE PREFERRED EMBODIMENT

The present invention relates generally to a computing or portable device. The present invention includes a server 300, and a computer 3001 which is coupled to the server 300 by a wired or wireless network via a network including internet or mobile phone network. Please refer to FIG. 9, it includes a processor 3101 to process and control data and signal. An input unit 3501, three dimension display 3601, OS 3451, an image capturing device 3521 for capturing an image are also provided. The device also includes memories 3551 coupled to the process 3101 for storing the data and OS. They include hard drive, ROM, RAM, FLASH. The vocal signal is sent to the final output such as speaker 3901. A digital code processing unit 3801 is coupled to the processor 3101, and may process and decode or encode the data captured by the image capturing device 3521, and thereby storing the encoded data in the memories or displaying on a designation area of the display, or storing the fetched data within a certain format of a text document for collecting the information without man power to increase the efficiency and reduce the error. The user may collect or duplicate the information easily. The fetched and duplicated information includes table, word document, website, e-mail address, image, personal information, ticket, communication information, cooperation name, address etc. The device includes but not limited to cellular phone, PDA (personal digital assistant), smart phone, notebook, digital still camera, digital video camera, medium player (MP3, MP4), GPS and the equivalent thereof.

The three dimension display 3601 may be switched between two-dimension and three dimension display for displaying the three dimension image. Namely, a lenticular lens is constructed over the display 3601, for example, Sharp's Auto3D LCD, Horizontal Interleaved 3D Display, vRex microPol 3D LCD, Vertical Interleaved 3D LCD, DTI, Pavonine. US20090153653 also disclosed a three dimension display.

Figure 9:
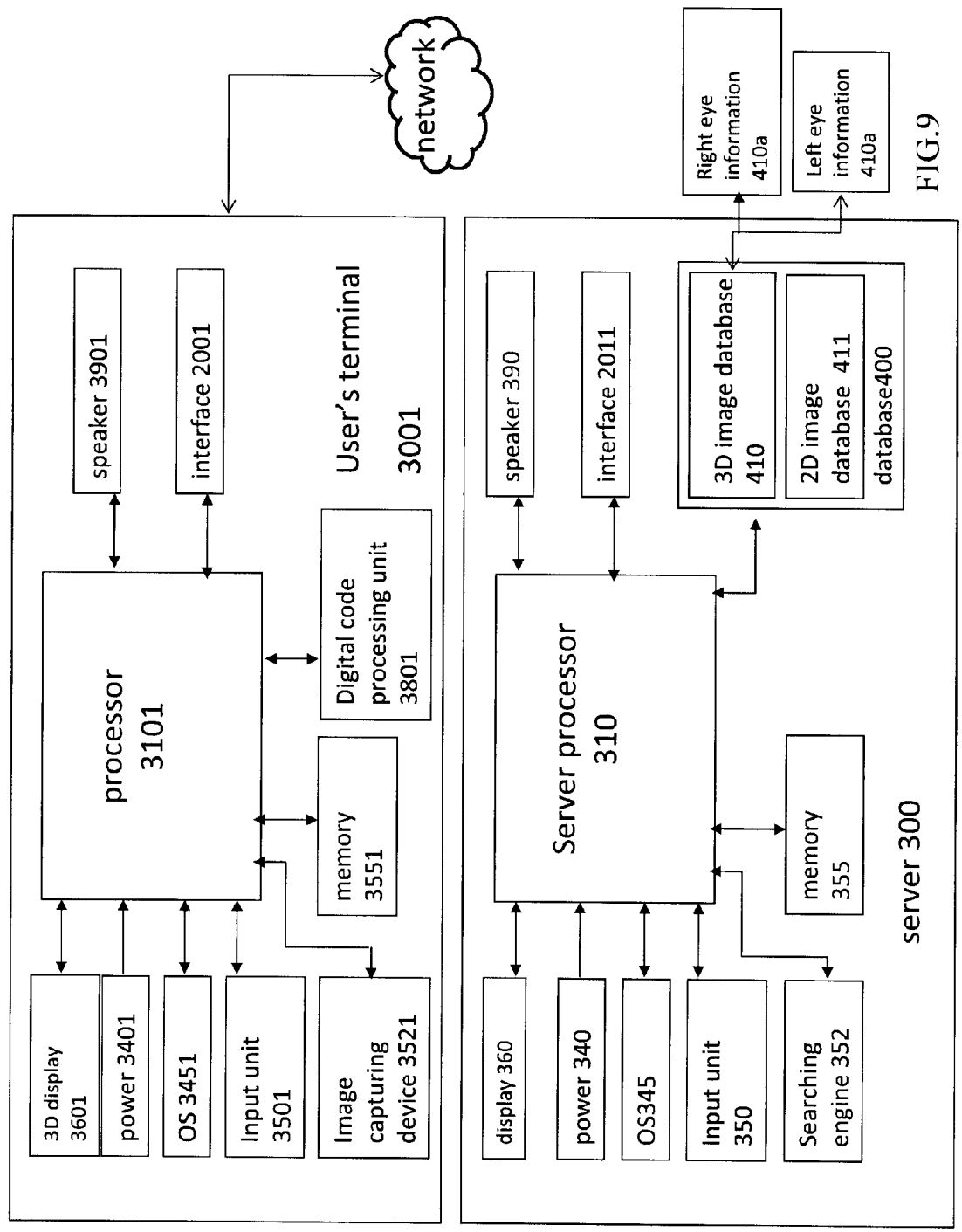
FIG. 9 shows the functional diagram of the present invention.

Please refer to FIG. 9, the server processor 310 is used to process and control signal. An input unit 350, three dimension display 360 and server OS 345. The device also includes memory 355 coupled to the process 310 for storing the data and/or OS. They include hard drive, ROM, RAM, FLASH. The vocal signal is sent to the final output such as speaker 390. A searching engine 352 is employed to search data or information in the cyber space by the key word. The database 400 includes web information including two dimension image data base and three dimension image data and the three dimension on-line game data base to store the two dimension image, three dimension image and three dimension on-line game. The data in the databases may be transmitted to the display 3601 of the user. The remote server could be portal web sites or searching web sites.

The stereo image is fetched by three dimension image capturing device and the 3-D image of the database is fed into by the interface 2011. The fed data includes left and right eyes information.

The stereo image capturing device includes two image capture devices which are separated with a distance. The image capture device includes CMOS or CDD. Pluralities of micro-lens are configured over the CMOS or CCD. The distance may be the space between the two pupils of the human.

Figure 1:
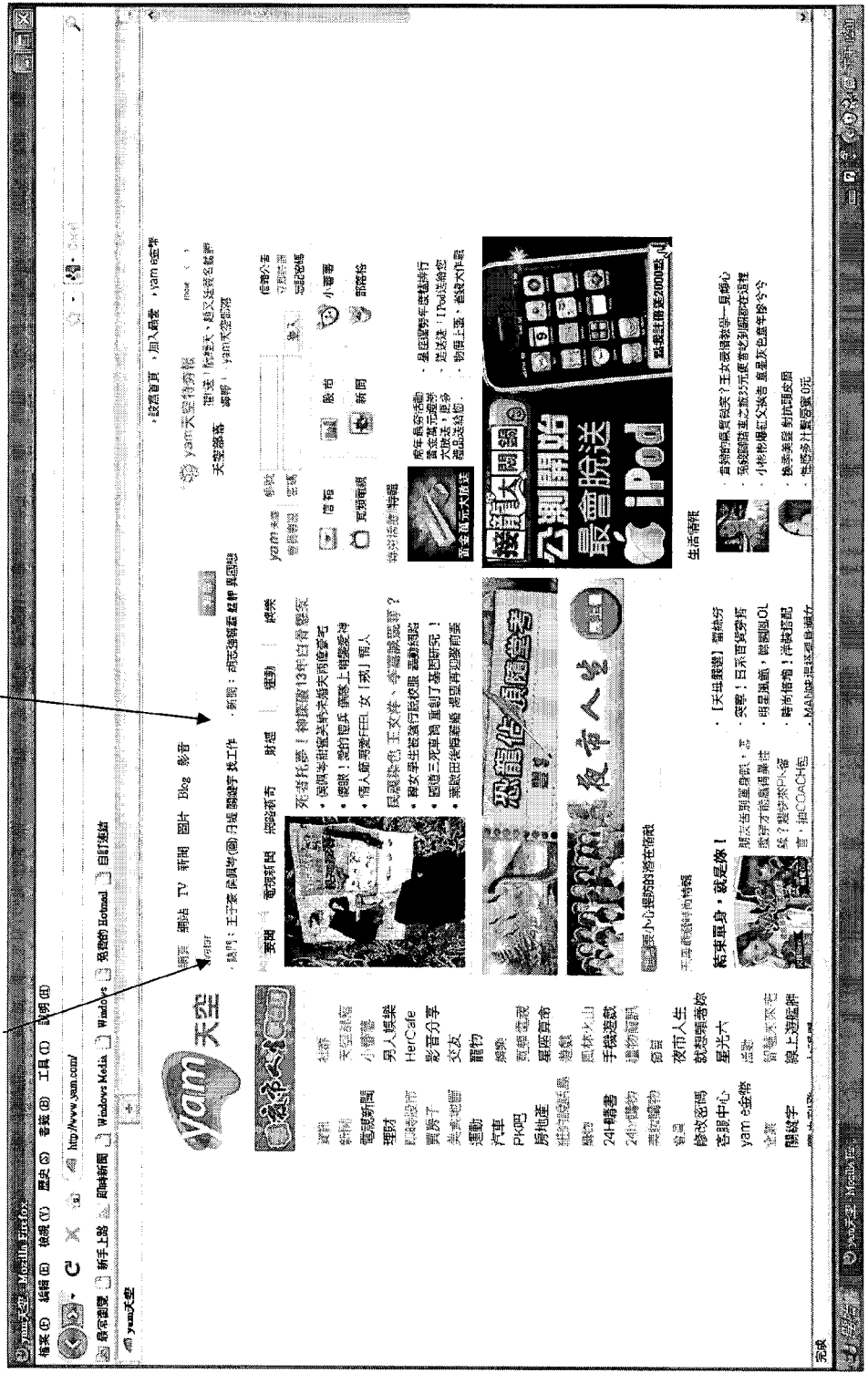
FIG. 1 shows the home page of currently portal website.
Figure 2:
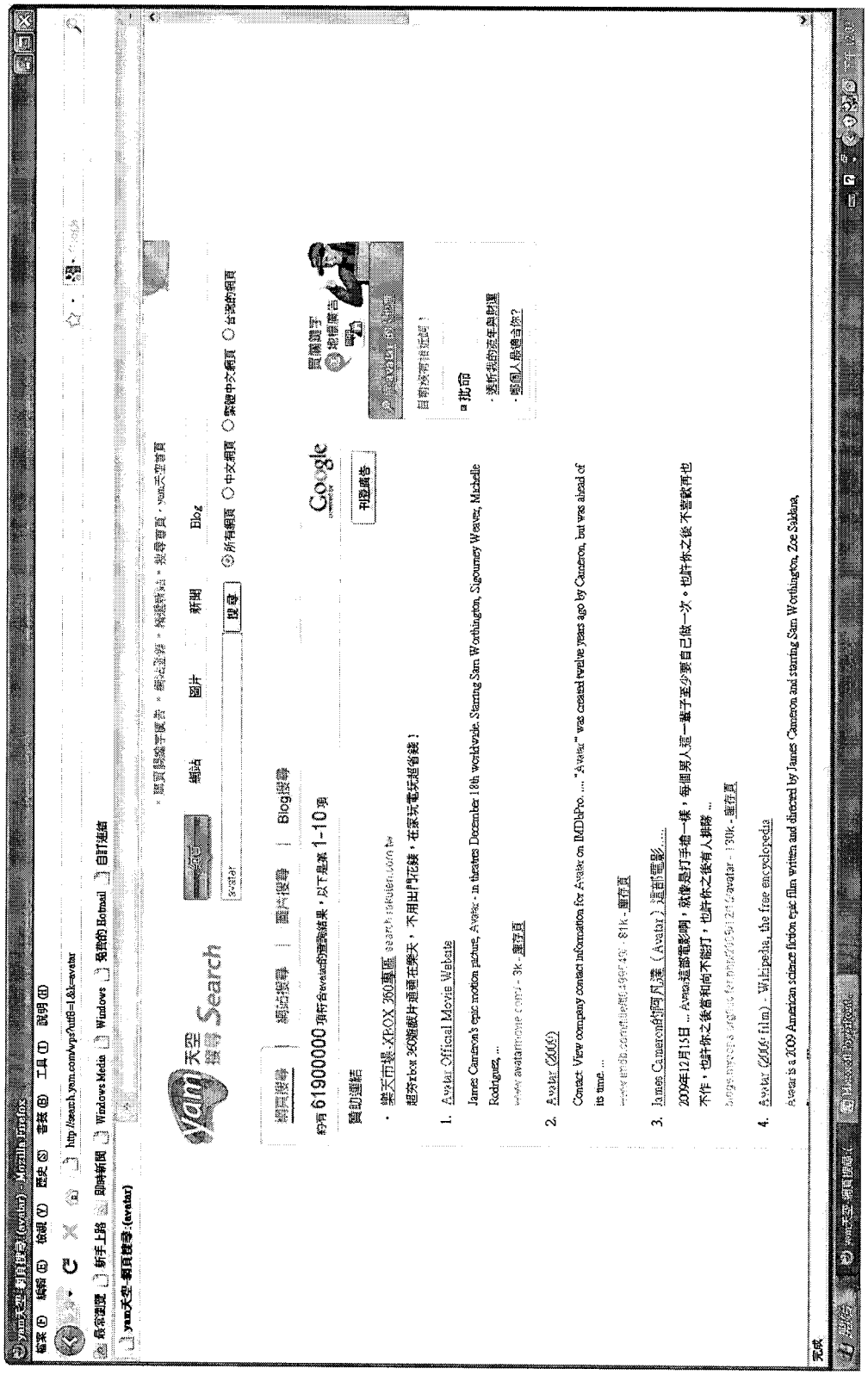
FIG. 2 shows the searching result of the currently portal website.
Figure 3:
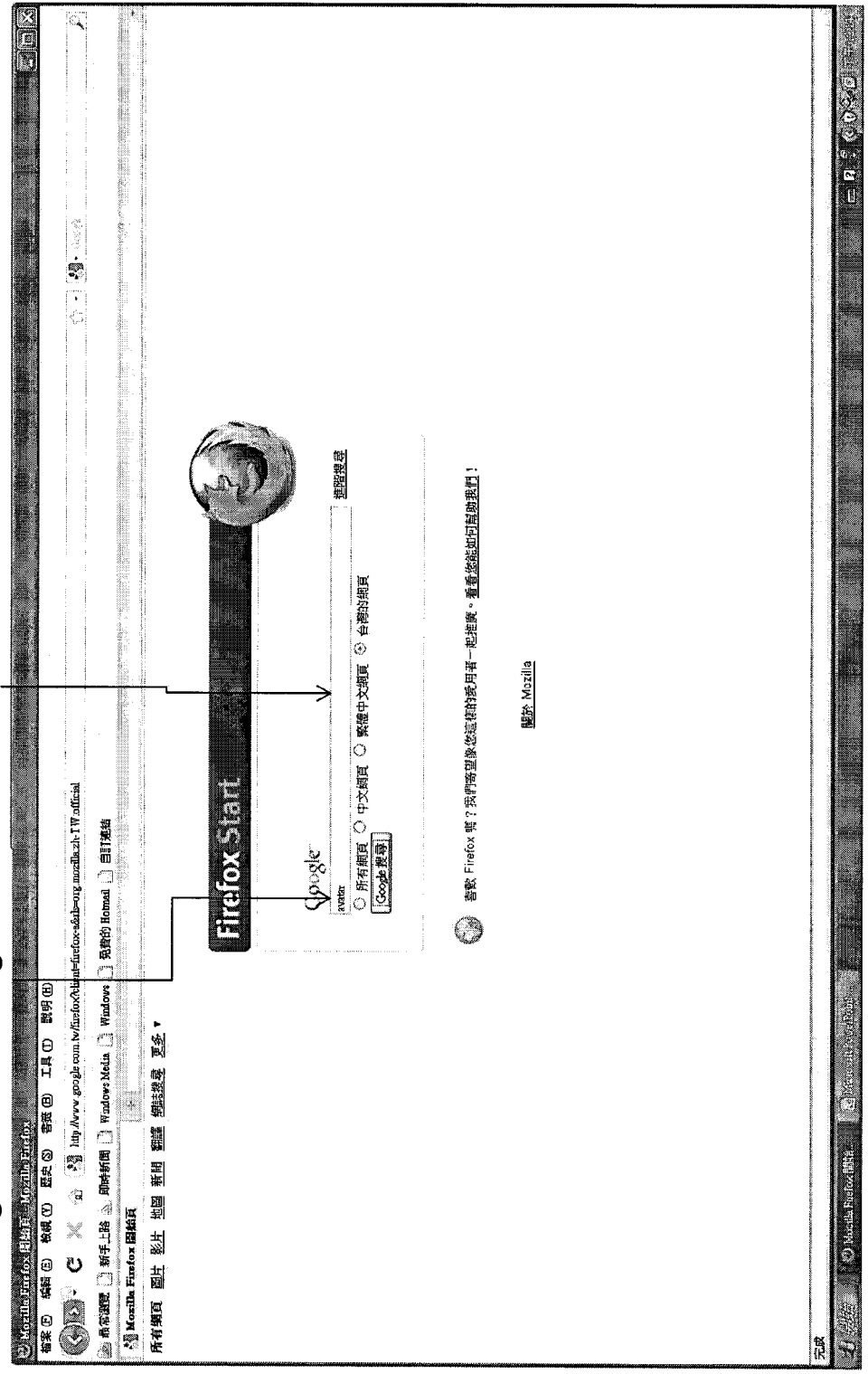
FIG. 3 shows the currently searching website.
Figure 4:
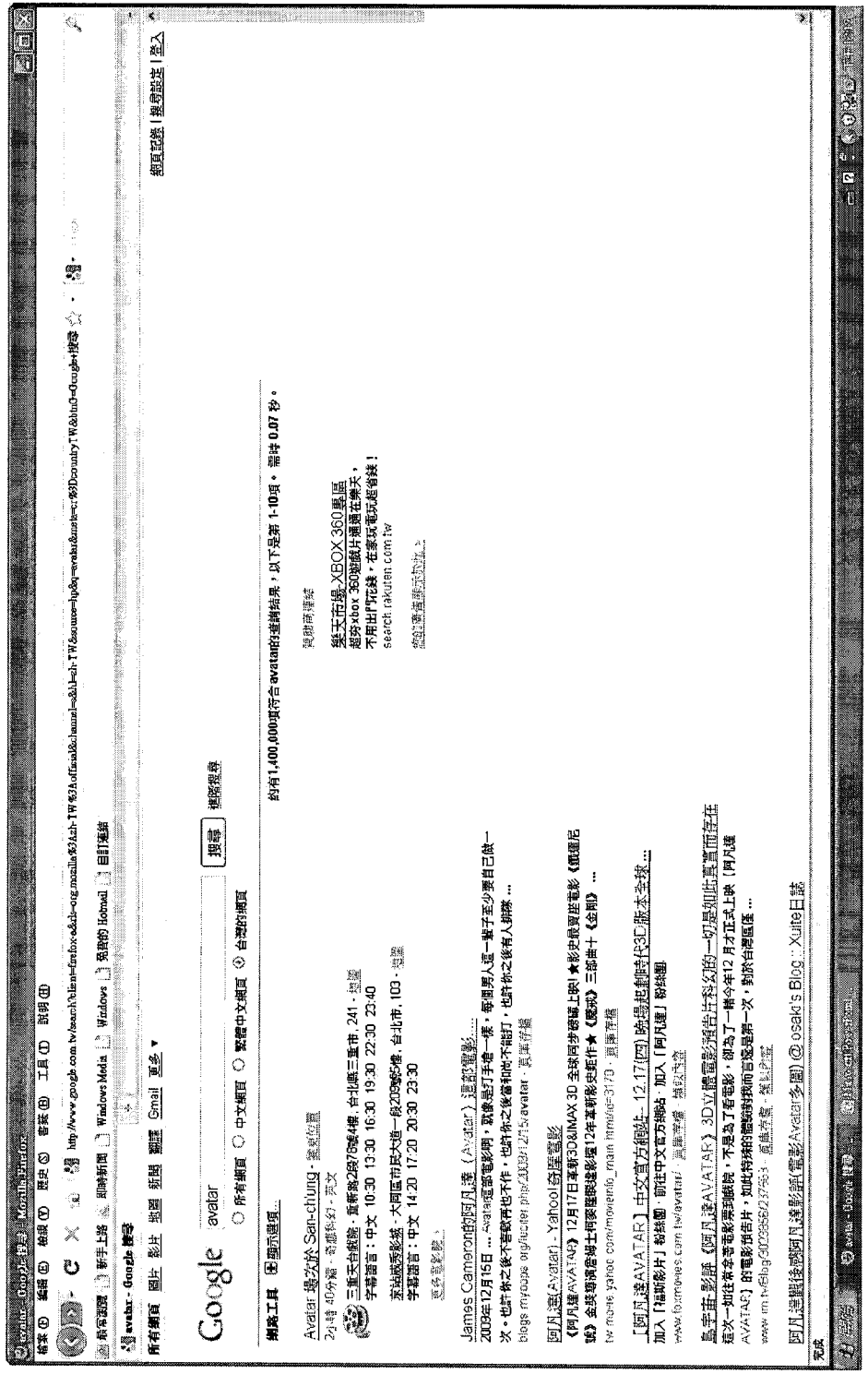
FIG. 4 shows the searching results of the currently searching website.
Figure 5A:
FIG. 5A shows the currently portal website.
Figure 5B:
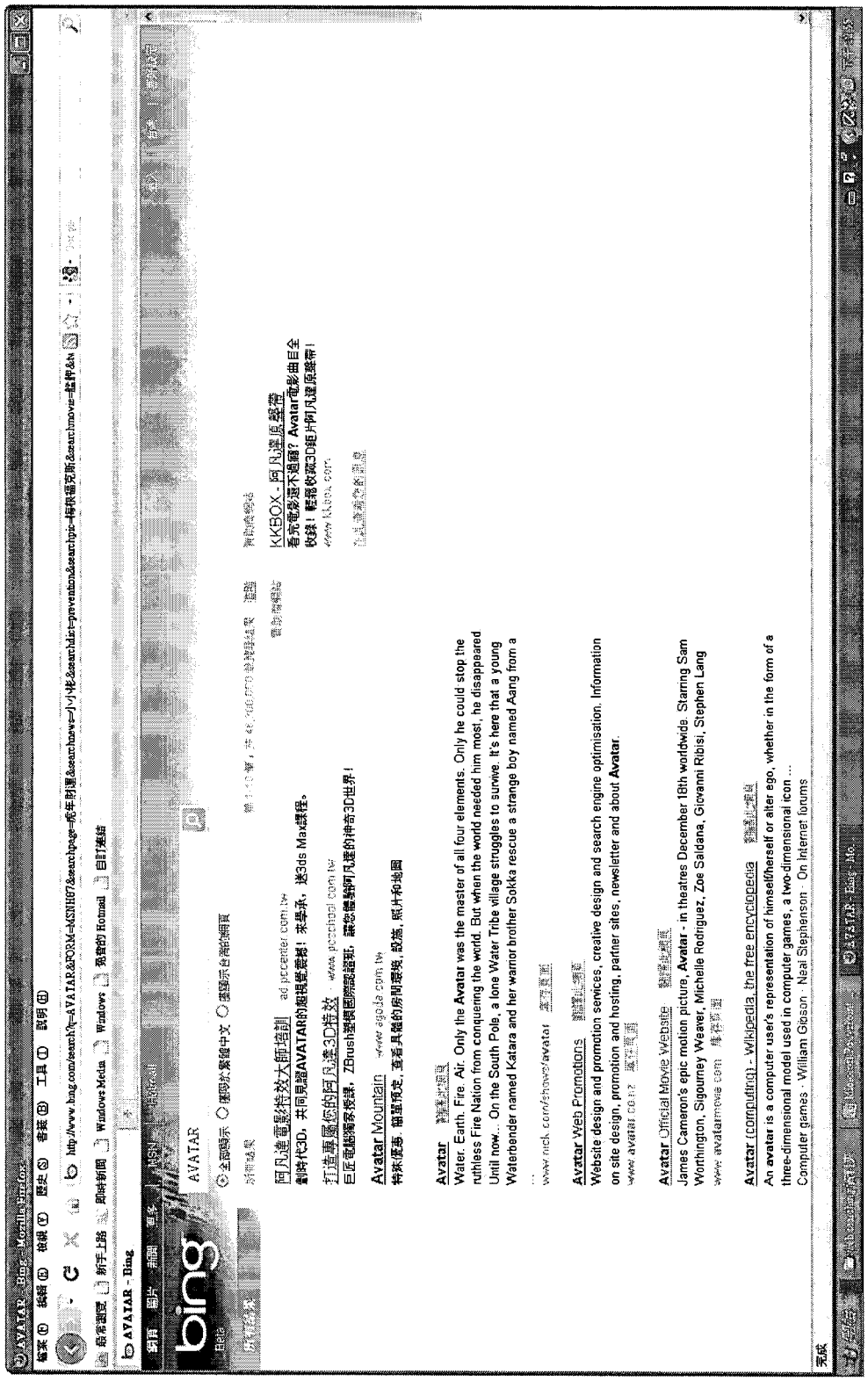
FIG. 5B shows the searching results of the currently portal website.
Figure 7:
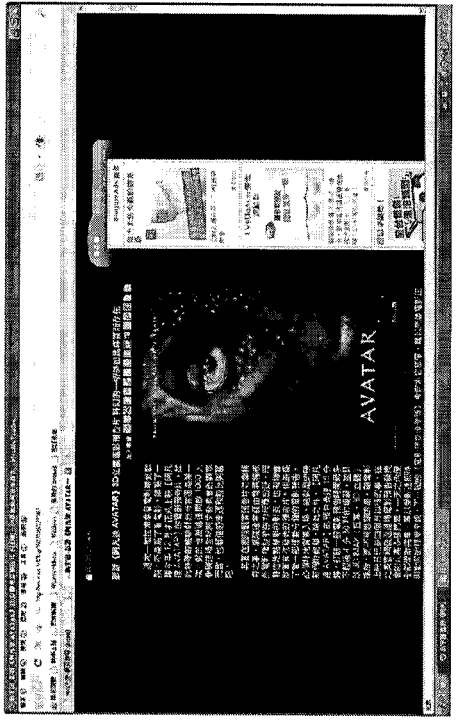
FIG. 6-FIG. 8 shows the clicking result.
Figure 6:
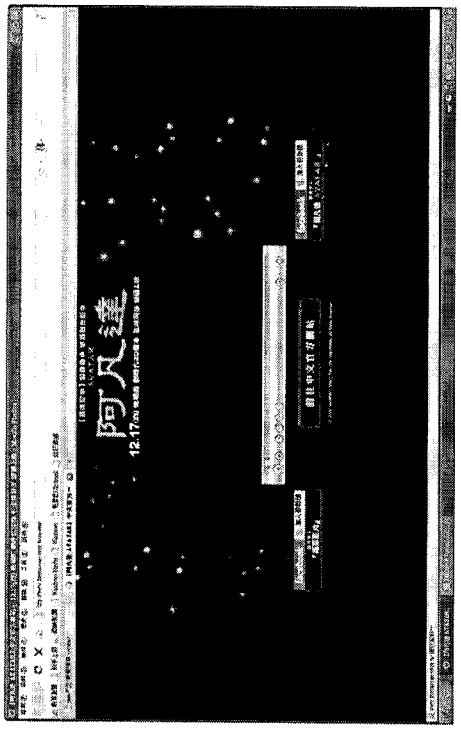
Figure 8:
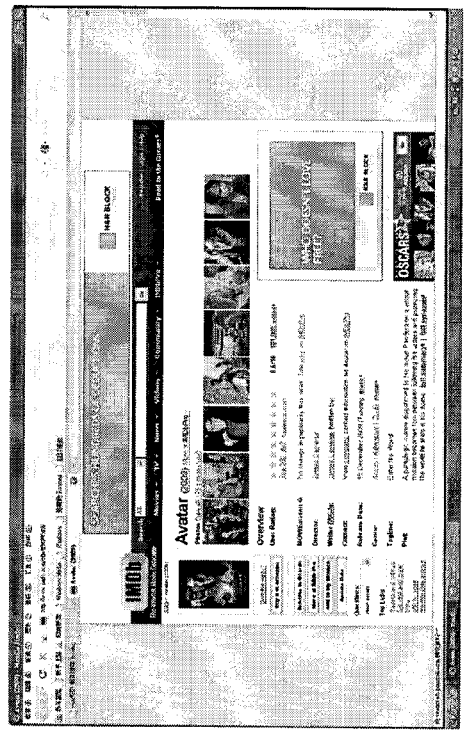

Refer to FIGS. 1 and 3, the remote server send the searched website to the user's terminal. When the user input keywords to the certain box, followed by sending the keyword to the server by clicking the icon for searching the desired information. The searching engine may search desired information based on the keyword, and displaying the result to the terminal of the user.

Figure 10:
FIG. 10 shows the searching results of the present invention.
Figure 11:
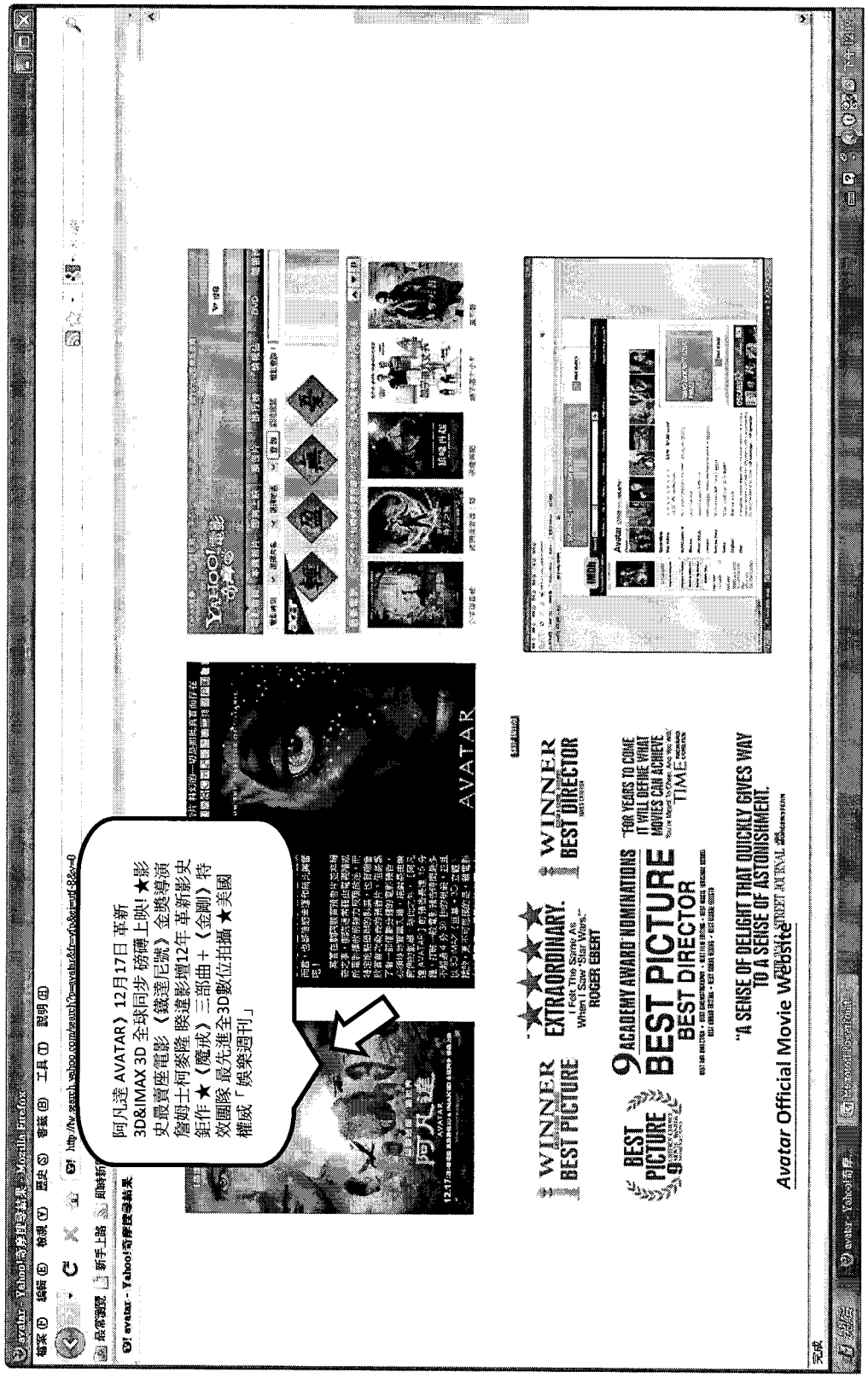
FIG. 11 shows the abstract of the results of the present invention.

The present invention is different from the conventional method, the result is expressed by the visual image base instead of text base as shown in FIG. 10. It indicates that the present invention is not only sending the website linking of the website to the user, but also fetching and sending the home page image or image of the representative figure W to the terminal of the user. The website linking A and/or the website title or name is transparent to the user or display to the user. The transparent technique is well-known in the related art, and hence it will not be described redundantly hereinafter. When the cursor moves over the icon or image, the abstract or introduction of the web is shown on the display. If the touch panel is employed, the abstract or introduction of the web is shown after the figure movers over the area. After the icon or image is clicked by the mouse or finger, the user is leaded to the clicked web. The visual base expression allows the user to fetch desired information quickly.

Based on the multiple-cores computing, the right eye information 410a and left eye information 410b may be processed and transmitted to the terminal of the user, thereby displaying the 3-D information. The method of transmitting 3-D information includes transmitting the right eye information 410a and left eye information 410b by interleaving to the user's terminal. The right eye information 410a and left eye information 410b includes data frame. The transmitted method may include transmitting one eye visual data frame, then transmitting another eye visual data frame. Namely, during the phenomena of the visual persistence, the different eye information is transmitted by interleaving. It may be changed after transmitting several sets of the data. The transmitting web information may include hybrid information including 3D and 2D information. Namely, the web information includes 3D and 2D information. The user's terminal 3001 may receive the desired information by the interface 2001 in step 230. The right eye information 410a and left eye information 410b are transmitted to the user's terminal by interleaving and following by displaying the information by interleaving during visual persistence of eyes, step 240. The user may view the 3D image by bare eyes. The interleaving refers to transmit at least a set of one eye information, then at least a set of another eye information is transmitted. The above sequence is continuous.

Please refer to FIG. 13. The remote server transmits a web page with a selection icon for selecting the imaging mode to the user's terminal in the step 200a. That is, the transmitted web page includes a virtual button or an icon for switching two-dimensional or three dimensional images, so as to facilitate the user to choose the imaging mode. Please refer to the step 200 in FIG. 13, when the user clicks the virtual button or the icon, on one hand, the requiring command can be transmitted to the remote server via the network in step 210. On the other hand, the user's terminal can be notified to switch the three dimension image display to the three dimension display mode in step 210a. When the server interprets the command, the remote server can fetch information from the three dimension database in step 215. Based on the multiple-cores computing such as the four-cores computing, the right eye information 410a and left eye information 410b may be captured, and subsequently, the three dimension digital image can be transmitted to the user's terminal in step 220. If the desired image is selected as three dimensional, the server can transmit the three dimensional web pages, or three dimensional images, or three dimensional games 410 to the user's terminal. For example, the three dimensional digital image package or the information frame of the left eye and that of the right eye can be transmitted to the user's terminal 220 alternately. The transmitting procedure may also introduce transmitting the image frame of one eye after transmitting the image frame of another eye, and vice versa. In an embodiment, the server can transmit left, right eye information to the user's terminal at intervals. In other words, several groups of left, right eye information can be transmitted within the visual persistence period, wherein the left eye information and the right eye information can be transmitted by one by one or one set by one set. It may be changed after transmitting several sets of the data. The transmitted information can be absolutely three-dimensional image or include two-dimensional and three-dimensional images simultaneously. Namely, there are some three-dimensional images combined in the two-dimensional electronic document or the web page. Through the wireless or wired network, the user's terminal 3001 can receive the three-dimensional image through the interface 2001 in step 230. The left and right eye three-dimensional digital image package or information frame can be displayed on the display 235 by interleaving. The left and right eye information has to be interleaved when displayed. Namely, during the phenomena of the visual persistence, the different eye information is transmitted by interleaving. It may be changed after transmitting several sets of the data. The three-dimensional image can be displayed through the three-dimensional display 360 in the step 240. The user may view the 3D image by bare eyes without particular glasses.

In the present invention, the portable communication device can be introduced to receive the web page, wherein the portable communication device may include, but is not limited to, a smart phone, a cell phone, a calling device, a PDA, or the like. The system of aforementioned wireless communication device generally comprises a wireless communication module, which is compatible with protocol of bidirectional transmission, and the cell phone and the PDA comprises at least one bidirectional communication module. In regard to the bidirectional communication module, the adapted protocol is, for instance, GSM, CDMA, PHS, 3G, 3.5G, 4G or the communication protocols of bidirectional communication device. Messages provided by service suppliers can be received by the bidirectional communication module, and can be decoded by a decoder, whereby being converted to recognizable signals. The wireless communication device comprises a microprocessor or a CPU, and a user interface coupled to the microprocessor for facilitating input of commands. The commands can be input by touch or voice control. Signals received by bidirectional communication module can be output by the microprocessor and stored in the data or program of the memory unit for being processed, such as checking communication protocol, reading or determining the signals. The received data can be displayed by the display, the display is generally a LCD, or a planar display.

Figure 12:
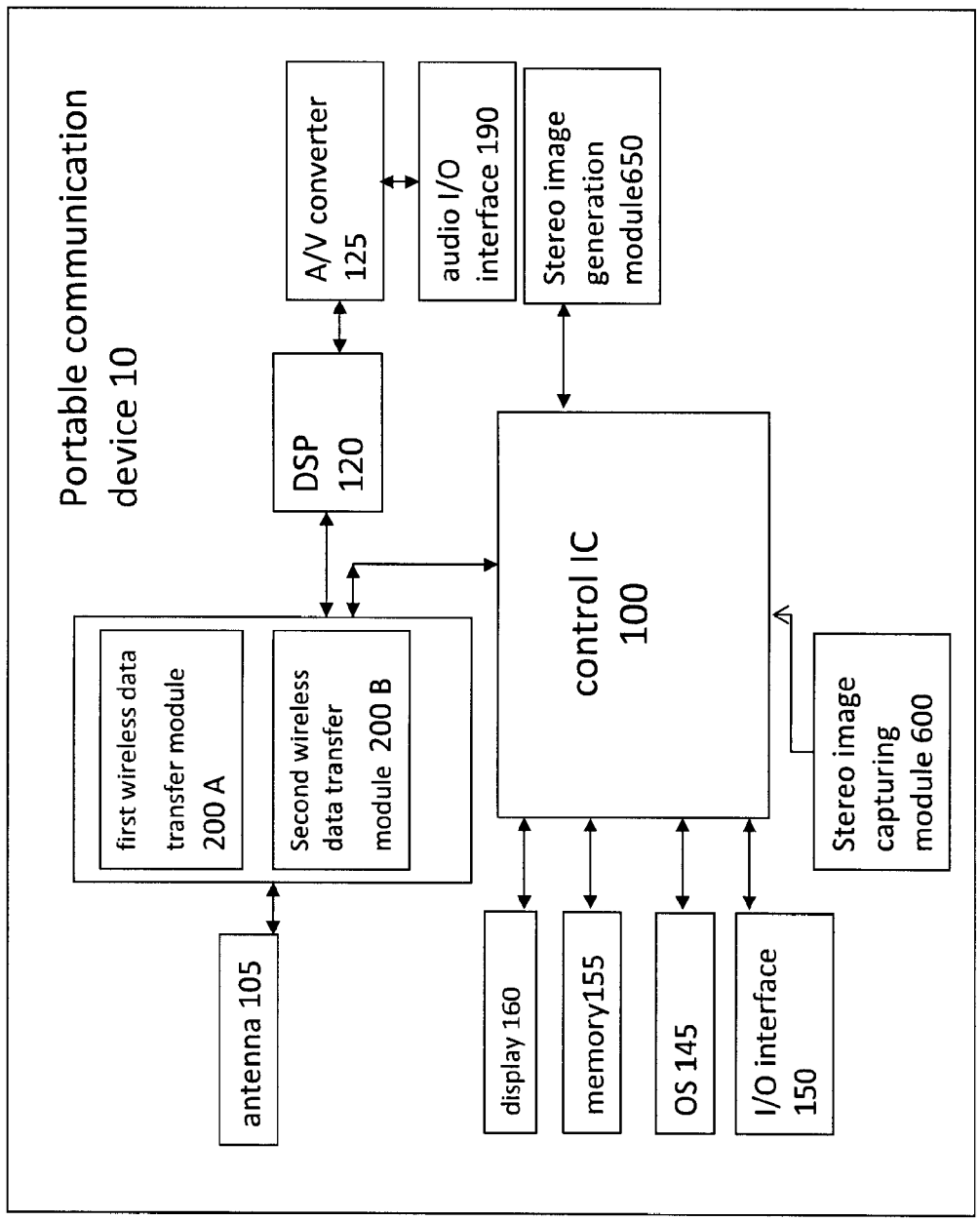
FIG. 12 shows the functional diagram of the present invention.

FIG. 12 exhibits a functional diagram of the portable communication device 10 with a stereo image capturing module. If the portable communication device is a cellular phone, it may comprise the SIM card connector for carrying the SIM card, which is well known in the art, and hence it will not be described redundantly hereinafter. In other types of cell phones, such as PHS or some CDMA systems, the SIM card is not certainly necessary. The figure is introduced to explain rather than limiting the present invention. The portable communication device 10 includes a wireless data transfer module 200A, which can be a video RF module for transmitting or receiving mobile phone signals, and aforementioned module is well known by those ordinary persons skilled in the art. As well known, the RF module is coupled to an antenna system 105, which may be single or multiple antennas according to demands, and it may further include the base band processor. The antenna system is connected to a radio transceiver for transmitting or receiving signals. The wireless data transfer module 200A is compatible with various mobile communication protocols, such as W-CDMA, CDMA2000, CDMA2001, TD-CDMA, TD-SCDMA, UWC0136, DECT, or 4G systems. These systems allow users to communicate through video telephone. The RF module may be introduced to perform transmitting and receiving of signals, frequency synchronization, base band processing, and digital signals processing, etc. The hardware interface of SIM card is used to contain (or insert) a SIM card. And finally, signals can be transmitted to the audio I/O (input/output) unit 190.

The portable communication device 10 may include a DSP (digital signal processor) 120 and/or a central control unit 100, encoder/decoder (not shown) and A/V converter 125, and the arrangement of those elements can be determined based on applications. The portable communication device 10 further comprises a display 160, OS (operation system) 145, and memory 155, wherein the memory 155 includes ROM, RAM, and nonvolatile FLASH memory. Aforementioned units can be coupled to the central control unit 100 or the DSP 120 respectively. Aforementioned memory can be nonvolatile memory, micro-disk. The wired I/O interface 150 is coupled to the central control unit 100, and it may be USB or IEEE 1394.

The portable communication device 100 may also include a second wireless data transfer module 200B, which may comply with a communication protocol with communication distance shorter than the first wireless data transfer module 200A, such as WiFi, or WiMax, etc. In an embodiment, a wireless short range (local) internet module can be introduced, and LAN, MAN (metropolitan area network), or other network, such as Wi-Fi or 802.11x (x refers to a, b, g, n), are also compatible in the present invention. "Short range" refers to that the communication distance is shorter than the mobile phone communication distance. Further, the wireless local network module may be compatible with the WiMax or standard protocol. And users can connect internet or hot spots via WiFi or WiMax.

The stereo image capturing module 600 and stereo image generation module 650 are coupled to aforementioned DSP 120 or/and the central control unit 100. The stereo image capturing module 600 includes at least two image capture elements with a distance and corresponding lens. The image capture elements can be CMOS, or CCD with a plurality of micro-meniscus configured thereon for facilitating light concentrating and stereo imaging, and the preferable distance between them is the distance between two pupils of human. Objects directly observed by human beings can be simulated by two separated image capture elements, and therefore, images with parallax can be generated due to the simultaneously captured images form different viewing angle. Those two image capturing elements are preferably arranged along the major axis of the portable communication device. After two captured images are stored, the images can be processed by the stereo image generation module 650 to generate similarly or virtually stereo image, which can benefit producing stereo images, photos, stereo table-cloth on the screen, stereo images used for the address book, etc. The stereo images can be synthesized by a left image and a right image. The imaging process may also include zooming, rotating, translating, swapping left and right images, trimming, smoothing display by noise reduction, and so on. The 3D display 160 can be employed to display, such as Sharp's Auto3D LCD, Horizontal Interleaved 3D Display, ex: vRex microPol 3D LCD, or Vertical Interleaved 3D LCD, ex: DTI, Pavonine. A stereo display is also disclosed in the United States patent application numbered 2009015365. The stereo images generated by the portable communication device can also be uploaded to websites, blogs, or others through the first wireless data transfer module 200A or the second wireless data transfer module 200B, and that is direct and convenient because the computer and the memory card are not necessary. The stereo image generation module 650 can also configured at the remote terminal, and images captured by the stereo image capture module 600 can be transferred to remote terminal for processing via connection between remote computers or servers and the first wireless data transfer module 200A or the second wireless data transfer module 200B; or after connected, the stereo image generation module 650 can be activated by the portable communication device 10 to execute stereo images processing procedure, and the results can be stored in remote computers, servers or the portable communication device 10.

The present invention can make many website users enjoy the fun and service derived from the three dimension images. Those three dimension images can be transferred to the user's terminal through remote computing.

Aforementioned description is to illustrate purposes of the present invention, technical characteristics to achieve the purposes, and the advantages brought from the technical characteristics, and so on. And the present invention can be further understood by the following description of the preferred embodiment accompanying with the claim.

What is claimed is:

1. A visual image searching method, comprising steps of:
providing a server including a visual image searching engine;
connecting said server by a user's terminal capable of connecting to said server, and said user's terminal including a stereo display;
transmitting a searching character string to said server by said user's terminal via network;
transmitting searching results to said user's terminal by said server through said network based on said searching character string, and wherein said searching results are displayed by visual image base and include website linking of websites corresponding to said searching character string, and displayed by said stereo display to allow a user may browse said searching results by visual image base, wherein said server transmits a website with a selection icon for selecting imaging mode to said user's terminal, said transmitted website including a virtual button or an icon for switching between two-dimensional and stereo images to allow said user to choose image mode, wherein said searching results visual image are transmitted by interleaving right eye information and left eye information to said user's terminal if a stereo imaging mode is selected;
moving a finger or cursor to one of said home page relative visual images;
displaying abstract or outline of said website by said display after said finger or cursor is located over said home page relative visual images;
clicking on said home page relative visual images displayed on said display; and
linking to a corresponding website after clicking on said home page relative visual images.

2. The visual image searching method according to claim 1, further comprising a step of displaying website of said website linking.

3. The visual image searching method according to claim 1, wherein said display is a touch panel.

4. The visual image searching method according to claim 1, wherein said user's terminal includes a computer, a notebook, a tablet, a portable communication device; wherein said network includes cellular, WiMax, or Internet network.

5. A visual image searching method, comprising steps of:
providing a server including a visual image searching engine;
connecting said server by a user's terminal capable of connecting to said server, and said user's terminal including a three dimension display;
transmitting a searching character string to said server by said user's terminal via network;
transmitting searching results to said user's terminal by said server through said network based on said searching character string, and wherein said searching results are displayed by visual image base and include website linking of websites corresponding to said searching character string, home page relative visual images corresponding to said websites and displayed by said display to allow a user may browse said searching results by visual image base instead of text base, wherein said server transmits a website with a selection icon for selecting imaging mode to said user's terminal, said transmitted website including a virtual button or an icon for switching between two-dimensional and three dimension images to allow said user to choose imaging mode, wherein at least one of said home page relative visual images is three dimension image and is transmitted by interleaving right eye information and left eye information to said user's terminal and displayed by said three dimension display if a three dimension image mode is selected;
moving a finger or cursor to one of said home page relative visual images;
displaying abstract or outline of said website by said display after said finger or cursor is located over said home page relative visual images;
clicking on said home page relative visual images displayed on said display; and
linking to corresponding website after clicking on said home page relative visual images.

6. The visual image searching method according to claim 5, further comprising a step of displaying website of said website linking.

7. The visual image searching method according to claim 5, wherein said display has a touch panel.

8. The visual image searching method according to claim 5, wherein said user's terminal includes a computer, a notebook, a tablet, a portable communication device; wherein said network includes cellular, WiMax, or Internet network.

* * * * *